United States Patent
Davis

(10) Patent No.: US 6,912,281 B2
(45) Date of Patent: Jun. 28, 2005

(54) ROUTE DELAY SENSITIVE ECHO CANCELLATION

(75) Inventor: Charles R. Davis, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 152 days.

(21) Appl. No.: 10/330,430

(22) Filed: Dec. 30, 2002

(65) Prior Publication Data

US 2004/0125943 A1 Jul. 1, 2004

(51) Int. Cl.[7] ............................................. H04M 9/08
(52) U.S. Cl. ........................ 379/406.01; 379/406.02; 379/406.05; 379/406.06; 379/406.08; 379/406.09; 379/406.1; 379/406.11
(58) Field of Search ...................... 379/406.01–406.16

(56) References Cited

U.S. PATENT DOCUMENTS

| | | | |
|---|---|---|---|
| 3,499,999 A | 3/1970 | Sondhi | 179/170.2 |
| 3,500,000 A | 3/1970 | Kelly et al. | 179/170.2 |
| 3,789,165 A | 1/1974 | Campanella et al. | 179/170.2 |
| 4,031,338 A | 6/1977 | Campanella et al. | 179/170.8 |
| 4,582,963 A * | 4/1986 | Danstrom | 379/406.08 |
| 4,751,730 A * | 6/1988 | Galand et al. | 379/406.11 |
| 5,274,705 A * | 12/1993 | Younce et al. | 379/406.05 |
| 5,587,998 A * | 12/1996 | Velardo et al. | 370/289 |
| 6,011,846 A * | 1/2000 | Rabipour et al. | 379/406.06 |
| 6,167,133 A * | 12/2000 | Caceres et al. | 379/406.13 |
| 2004/0028217 A1 * | 2/2004 | Ebenezer et al. | |
| 2004/0062386 A1 * | 4/2004 | Tahernezhaadi et al. | |

* cited by examiner

*Primary Examiner*—Sinh Tran
*Assistant Examiner*—Ramnandan Singh
(74) *Attorney, Agent, or Firm*—Abdul Zindani; W. James Brady, III; Frederick J. Telekcy, Jr.

(57) ABSTRACT

Long distance telephone connections must commonly employ echo cancellers to eliminate irritating echo. The normal practice is to additionally employ non-linear processors (NLPs) as an integral component of an echo canceller in order to eliminate small residual echo which remains after initial echo cancellation. While such devices do indeed remove remaining residual echo, they also may introduce additional problems, such as suppression of the background signal. However, in some cases there is no need to deploy a potentially problematic non-linear processor. If the overall route delay of the telephone connection is not excessive, the participants do not notice the residual echo. Therefore, a determination is made of the end to end delay of the overall telephone connection. If the determined delay is not excessive, non-linear processing is not applied or is applied less aggressively. This results in a clearer telephone call, free from non-linear processor problems.

14 Claims, 3 Drawing Sheets

ROUTE DELAY SENSITIVE ECHO CANCELLATION

FIELD OF THE INVENTION

The present invention relates to the application and/or disengagement of NLP logic for the enhanced processing of voice over packet speech including echo cancellation. The present invention relates generally to long distance, cellular and packet voice communication and more specifically to an echo cancellation improvement implemented when the distance and/or end to end delay in a telephone connection is below a threshold.

BACKGROUND OF THE INVENTION

Since the origination of echo cancellation as described in the article "An adaptive Echo Canceller" Sondhi in The Bell System Technical Journal, Mar. 1967 and U.S. Pat. Nos. 3,499,999 to Sondhi and 3,500,000 to Kelly et al., it has been known that the maximum amount of echo that can be removed is inherently limited by numerous immutable factors, such as quantization employed in telephone networks, despite the developmental efforts by others such as described in U.S. Pat. No. 3,789,165 to Campanella et al. The remaining echo, often termed residual echo, is nonetheless perceptible to a participant in a telephone call where the overall path delay of the connection is excessive. Hence, means are further employed on echo cancellers to eliminate the residual echo. These means are generically referred to as non-linear processors and may also be referred to as suppressors or center clippers. The method of center clipping, which removes all signals below a certain energy level is described for example in U.S. Pat. No. 4,031,338 to Campanella et al. assigned to Comsat.

Non linear processing, which removes residual echo, often creates some new problems, the most serious of which is alteration of the background signal. Specifically, when a non-linear processor removes residual echo, it usually removes the background signal as well, often replacing it with low level noise, often referred to as comfort noise, so that the participants on the call do not experience pure silence which can be perceived as a dead phone line. Often the original background signal was not noise at all, but music or the sounds of people in a crowd. Such non linear processing can have the effect, therefore, of interfering with the character of the background, which, in some cases, may be important to the character of the call.

Referring to FIG. 2, a communication path consists of two end paths 21 and 22 and a long haul or bulk delay path 23. Typically, echo heard at a near end 21 is due to echo generated by the telephone 25 at the far end 22. Hence the delay involved in the perception of echo is twice the total of each end-path delay combined with the bulk delay.

FIG. 2 illustrates a representative communication link 20 between two telephones 24 and 25. The link is comprised of a near-end 21, a far-end 22, and a communication network 23 that interconnects the near-end 21 and far-end 22. The near-end 21 has a user telephone 24, a hybrid circuit 26, and an echo canceller circuit 28. Similarly, the far-end 22 has a user telephone 25, a hybrid circuit 27, and an echo canceller circuit 29. Far-end signal power, x, is received by the near-end. Signal y is the coupled echo signal from the far-end signal as well as the near-end signal produced by telephone 24. This near-end signal contains both the speech of the near-end telephone user and the background noise of the user's environment. Together, the near-end signal and far-end echo signal are represented as y.

As an illustrative example, a telephone call in Los Angeles may be routed through an Echo canceller in San Francisco, over a long haul circuit to another echo canceller in Chicago, and then to a terminating phone in Detroit. If the end-path delay between Los Angeles and San Francisco is 8 ms, the long haul delay from San Francisco to Chicago is 24 ms, the end-path delay from Chicago top Detroit is 6 ms, The total end-to-end delay is then 38 ms. The delay of the echo, termed round trip delay, is then twice the end-to-end delay or 76 ms. However, a call from Boston to Washington, which terminates locally at each end will have a very small end path delay and a bulk delay of 9 ms, hence a round trip delay of only 18 ms.

It is well known that the perception of echo is both a function of the level of the echo and the delay of the echo. In fact, echoes with delays of less than 10 ms are not perceived as echo at all. However, what is not generally appreciated is that low level echoes are imperceptible at significantly longer delays. In the two examples above, deployment of non-linear processing for the calls from Los Angeles to Detroit would improve the quality of the call. On the other hand, deployment of a non-linear processors the second example, from Boston to Washington, would degrade the call.

FIG. 1 illustrates a simplified block diagram of an equipment configuration for one terminal of a communication link which includes a near end hybrid. The communication link has a near-end 8 comprising a telephone 2, a four-to-two wire hybrid circuit 3, an echo canceller circuit 4, a filter 5 and a NLP 6. A far-end connected to communication network 23, can be similarly configured but is not illustrated in FIG. 1. During a conversation between the near-end and far-end users, the far end signal, x, which contains both the far-end user's speech and background noise, enters the near-end 8 as signal x at node 9.

The far-end signal x is provided to the four-to-two wire hybrid circuit 3 and then to near-end telephone 2. Due to the unavoidable non-linearities present in the hybrid circuit 3, some portion of the far-end signal power is coupled onto the output 7 of the hybrid circuit 3 as an echo. A composite signal y exists at node 7 containing the echo signal and the combined speech of the near-end user and any incidental background noise from the near-end user's environment. A filter having a filter length period selected and designed to be longer than the hybrid dispersion time is used prior to power level measurements at 7 to allow the echo canceller 4 to operate properly.

Echo canceller 4 synthesizes the expected value e of the echo signal from adaptive filter 5, and subtracts this value at 10 from the composite signal y existing at node 7. The resulting difference signal existing at node 14, is intended to contain only the near-end signal s originating from telephone 2. This signal may be further processed by the NLP 6 and is ultimately provided to the far-end telephone as signal z, through the communications network 23.

Echo is an important factor in communications which include a hybrid between a four wire communication network 23 and the end terminals 24 and 25 as illustrated in FIG. 2. When echo is present, and perceptible, it is preferable to eliminate the echo. When the echo is not perceptible, it may be preferable to avoid echo elimination and the resultant signal distortion. Typical efforts to eliminate echo required that the magnitude of the echo be determined. One way of determining the magnitude of the echo is through echo return loss (ERL) estimation.

Methods of measuring the echo return loss typically measure the power of a signal x at node 9, where the signal power from the far-end would normally exist. Additionally, the power level of the composite signal y, comprised of the coupled echo signal and any signal s generated by the near-end telephone 2, is measured at node 7. The measurement can be made when little-to-no signal is being generated at near end telephone 2. Assuming the signal power of any signal generated by the near-end telephone is very small in comparison to the coupled echo signal power, the ratio of the measured test signal power x to the measured power level y provides an estimate of the echo return loss (ERL) for the near-end 8. The magnitude of echo return loss is usually measured as a difference in dB between signal x and signal y.

A typical echo canceller, as illustrated in FIG. 1, includes an adaptive finite impulse filter FIR 5. Under the control of an adaptation algorithm, FIR filter 5 models the impulse response of the echo path. A non-linear processor (NLP) 6 can be used to remove residual echo that may remain after linear processing of the input signal. The echo canceller may also typically include a double talk detector 11. Double talk occurs when both far end and near end speech are present at the same time. A double talk detector 11 can also be used to control and inhibit the adaptation process of the FIR 5 and/or the NLP 6 when double talk is present and it may be undesirable to cancel or suppress echo because double talk will be suppressed.

In the echo canceller, the signal y is the perceived near end signal. Signal y is a combination of the actual near end signal s and the echo from the far end signal x which comes through hybrid 3. The output signal d from the combiner 10, is the signal y less the echo estimate generated by the adaptive filter 5. The adaptive filter 5 is programmed to generate an output signal e that is as close to the echo as possible so that the echo is largely cancelled by the echo estimate e and the difference signal d closely resembles the generated near end signal s. The NLP 6 controls the amount of signal d that is transmitted to the far end. When there is no near end signal s, or a large echo over riding near end signal is present, NLP 6 can provide comfort noise to the far end instead of near end signal so as to prevent any possible uncancelled echo from being transmitted. When a valid s exists, NLP 6 opens so as to let the far end hear the signal. False detection of a lack of near end signal s can cause clipping of speech and failure to detect echo can result in echo leak through the NLP. The NLP as an on/off switch can result in abrupt audible changes which are undesirable in speech communications. Further, the use of the NLP 6 when the echo would be imperceptible to participants in the call causes unneeded distortion of the signal.

Referring to FIG. 1, typically the non-linear processor 6 is co-located with the echo canceller circuit 4. Usually an echo canceller 4 is aware of the end path delay in the end path 8 that it is canceling. However, a canceller typically has no knowledge of the bulk delay or of the end path delay at the far end. For this reason, a canceller 4 cannot normally effect a control on an associated non-linear processor 6 based upon bulk path delay. The common practice therefore is to leave non-linear processors enabled for all telephone calls. Hence the best possible quality may not be obtained on shorter connections.

SUMMARY OF THE INVENTION

The present invention teaches the assessment of the overall end-to-end delay of a telephone connection to determine the implementation of non-linear processing.

In this invention, the quality of calls in which the end to end delay is not excessive, are improved by either removing the non-linear processor or by altering its effects. The procedure consists of determining the overall end to end delay and modifying the action of the non-linear processor if the delay is not excessive.

A communication link includes near end and far end echo cancellers. Each echo canceller includes a non-linear processor (NLP). The present invention adds a control mechanism to effect control on the NLP to enhance voice processing under low delay conditions. The echo canceller determines the end path delay and/or maximum end path delay at its local end. The local end path delay value information is made available to the local control mechanism. In one embodiment the control mechanism is additionally able to receive information from other sources and hence learn the bulk delay and the end path delay at the other end of the telephone circuit. In other embodiments, the bulk delay can be determined by communicating messages between the two cancellers. In other embodiments, the bulk delay and end path delays are provided to a switch and/or gateway which provides total delay information to the control mechanism to effect the control of the present invention. The means by which the cancellers learn of the bulk delay and the end path delays is irreverent to the implementation of the control for modification of the non-linear processor activity of the present invention.

The control mechanism can additionally be provided with information regarding the expected level of returned echo. The control mechanism is able to disable the NLP and will do so if it determines that the residual echo will not be perceptible. Additional factors, such as the levels of the background may also be considered. The actual NLP modification strategy taken is irrelevant to this invention.

Each canceller has sufficient information to effect a control on it associated non-linear processor. The control exercised on the associated non-linear processor can depend on a number of factors and the implementation of specific control not disclosed herein does not depart from the scope of the present invention. For illustrative purposes, the following actions can be implemented:

a) If the round trip delay is less that 30 ms, the non linear processing is entirely removed.

b) If the round trip delay exceeds 60 ms, the non-linear processor is not altered.

c) If the round trip delay is between 30 and 60 ms, the non-linear processor is removed only if the canceller is substantially removing the bulk of the echo—for instance if the residual echo is 30 dB below the original, signal, and otherwise does not alter the non-linear processing.

In another illustrative example, FIG. 4, a network management or switch device 51 is presumed aware of the long haul routing. The network device or switching device 51 then queries the echo cancellers 32 and 33 to determine the end path delays. Once all this information is assimilated by the network management or switching device 51, the information is communicated to the echo cancellers 32 and 33 which in turn may alter their non-linear processors in accordance with a desired strategy.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
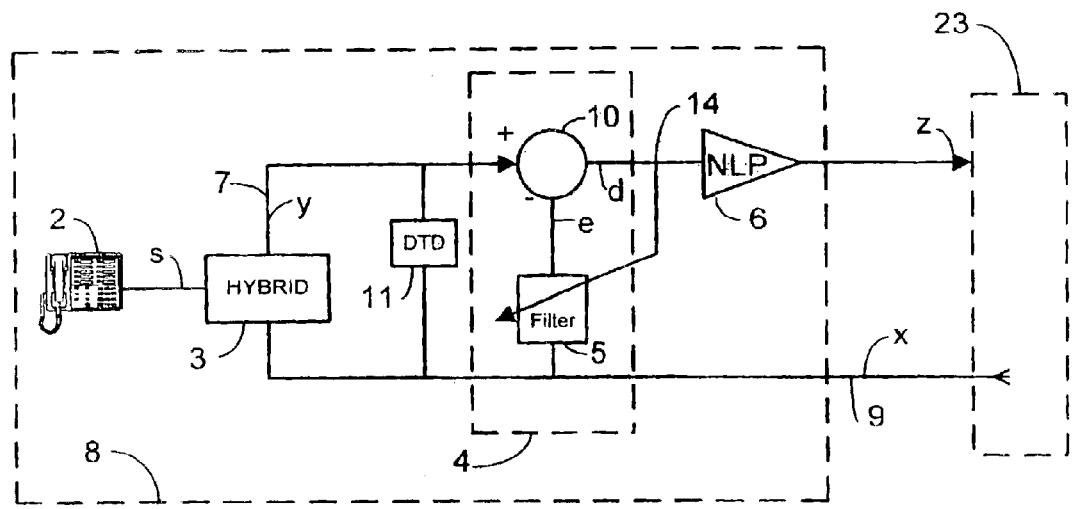
FIG. 1 is a simplified block diagram of one end of a communication link.
Figure 2:
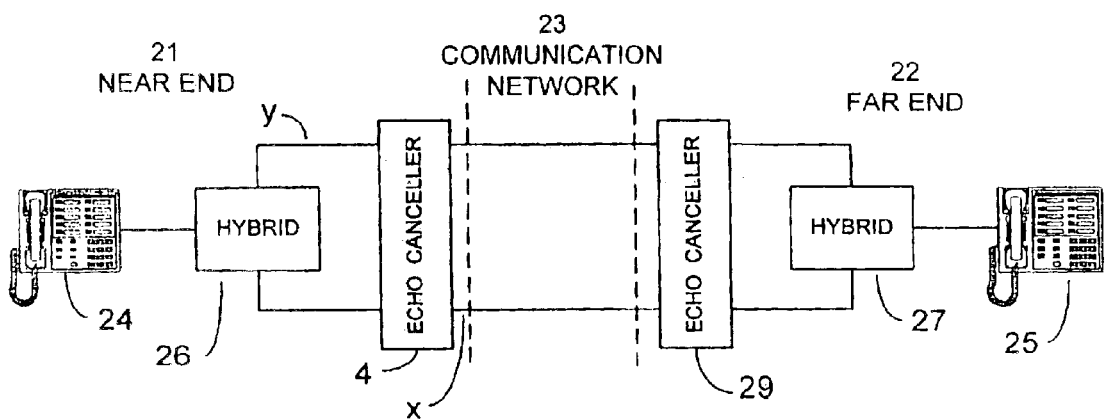
FIG. 2 is a simplified block diagram of a representative communication link between two two wire telephones each attached to the communication link via a hybrid.
Figure 3:
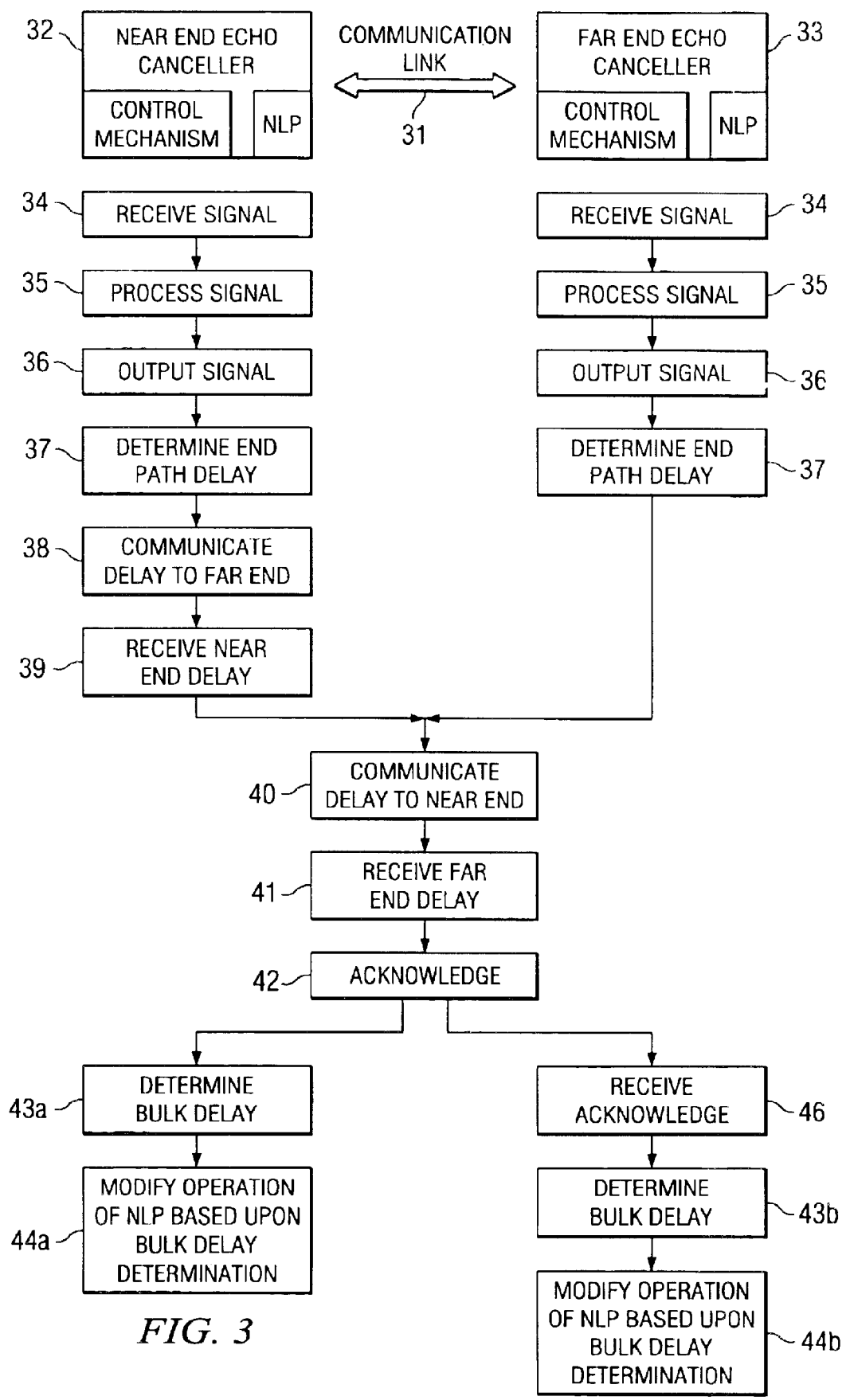
FIG. 3 is a flow diagram of an illustrative example of an implementation of the present invention.
Figure 4:
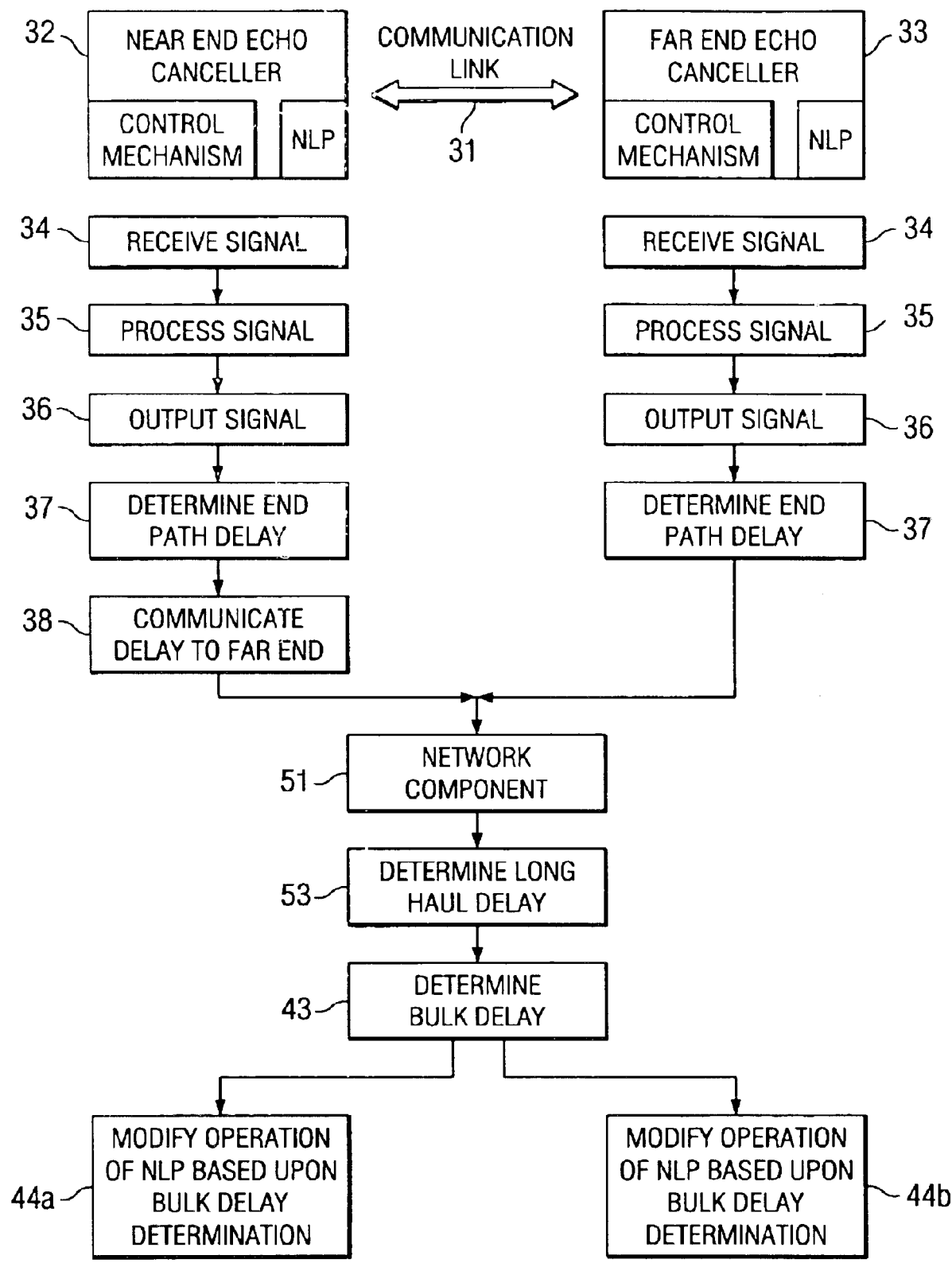
FIG. 4 is a flow diagram of an illustrative example of an alterative implementation of the present invention.

Exemplary embodiments of the present invention are illustrated in FIGS. 3 and 4. Two terminal ends of a communication link 31, include near end and far end echo cancellers 32 and 33. Each echo canceller 32 and 33 includes a non-linear processor resident in each echo canceller and a control mechanism of the present invention. The echo canceller is able to determine the end path delay that it is canceling, or at least a maximum end path delay. The local end path delay information is made available to the control mechanism, embedded in each canceller. In one embodiment the control mechanism is additionally able to receive information from other sources, such as a circuit switch or a gateway within the network. Each terminal end will communicate its end path delay and hence both ends are enabled to learn the bulk delay and the end path delay at each end of the telephone circuit. In other embodiments, the bulk delay can be determined by communicating messages between the two cancellers or through other devices within the packet network.

In one illustrative example, FIG. 3, the non-linear processor is assumed to be resident in an echo cancellation device at each end of the communication link 31. Near end echo canceller 32 and far end echo canceller 33 each receives signals 34, processes the signals 35, outputs signals 36 and determines its own actual maximum end path delay 37. Near end canceller 32 then and communicates its determined delay 38 to far end echo canceller 33. The far end canceller 33, upon reception of such information 39, immediately communicates its end path delay 40 to near end canceller 32. Upon reception of this second communication 41, the near end canceller 32 sends an acknowledgment 42 to the far end canceller 33. Both cancellers now have knowledge of both end path delays, and, by observing the elapsed time between the transmission and reception of the messages, can also determine the bulk delay 43.

In another illustrative example, FIG. 4, a network management element or switch device 51 is presumed aware of the long haul routing. The network device or switching device 51 then queries the echo cancellers 32 and 33 to determine the end path delays. Once all this information is assimilated by the network management or switching device 51, the information is communicated to the echo cancellers 32 and 33 which in turn may alter their non-linear processors in accordance with a desired strategy.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of non-linear processor control in an echo canceller of a communication link for improving speech quality, comprising:
    determining end path delays at each end of said communication link, each of said end path delays being determined locally at each end;
    communicating a first local end path delay from a first end to a second end;
    communicating a second local end oath path delay from said second end to said first end as a responsive message to said first end;
    determining a long haul delay of said communication link;
    determining a bulk delay of said communication link based upon said end path delays and said long haul delay; and
    utilizing said end path delays and said long haul delay of said communication link to modify effects of said non-linear processor.

2. The method of claim 1, wherein said communicating between said first and second ends includes a message sent between two corresponding non-linear processors by embedding a barely audible message in the communication link.

3. The method of claim 1, wherein said long haul delay is determined based upon said responsive message passing between said first end and said second end of said communication link.

4. The method of claim 1, wherein said long haul delay is determined by components within a packet network hosting said communication link.

5. The method of claim 1, wherein:
    to modify effects of said non-linear processor includes elimination of said non-linear processor effects.

6. The method of claim 1, wherein:
    said end path delays determined at each end of said communication link are maximum end path delay values.

7. The method of claim 1, further comprising:
    evaluating information regarding an expected level of returned echo, wherein to modify effects of said non-linear processor includes disabling said non-linear processor when a residual echo is not present.

8. The method of claim 7, wherein said evaluating includes levels of background noise in said expected level of returned echo.

9. The method of claim 1, further comprising:
    comparing said bulk delay to a low threshold;
    comparing said bulk delay to a high threshold;
    modifying said effects of said non-linear processor by completely removing said effects when said bulk delay is below said low threshold; and
    not modifying said effects of said non-linear processor when said bulk delay is above said high threshold.

10. A method of non-linear processor control in an echo canceller of a communication link for improving speech quality, comprising:
    determining a first end path delay at a first end of said communication link;
    determining a second end path delay at a second end of said communication link;
    communicating said first local end path delay to said second end; and
    communicating said second end path delay as a responsive message to said first end.

11. The method of claim 10, further comprising:
    determining a long haul delay of said communication link.

12. The method of claim 11, further comprising:
    determining a bulk delay of said communication link based upon said first and second end path delays and said long haul delay.

13. The method of claim 12, further comprising:
    using said first and second end path delays and said long haul delay of said communication link to effect operation of said non-linear processor.

14. The method of claim 12, wherein said operation of said non-linear processor includes disabling said non-linear processor, when a residual echo is not present.

* * * * *